P. PHILIP.
ROLL FOR HUSKING CORN.

No. 112,735. Patented Mar. 14, 1871.

Witnesses

Inventor
Peter Philip

United States Patent Office.

PETER PHILIP, OF STOCKPORT, NEW YORK.

Letters Patent No. 112,735, dated March 14, 1871.

---

IMPROVEMENT IN ROLLS FOR HUSKING CORN.

The Schedule referred to in these Letters Patent and making part of the same.

---

*To all whom it may concern:*

Be it known that I, PETER PHILIP, of Stockport, in the county of Columbia and State of New York, have invented certain Improvements in Rolls for Husking Corn; and I do hereby declare that the following is a full, clear, and exact description thereof, reference being had to the annexed drawing making part of this specification, in which—

The same letters of reference are employed in both figures in the designation of identical parts.

This invention relates to rolls for husking corn; and

My improvement consists in the details of construction and arrangement, which will be more specifically pointed out in the following description.

The rolls A and A', which may be made of any suitable material, are arranged in the frame B of a corn-husking machine parallel to each other and so as to come in contact.

They are geared together by spur-wheels C C' keyed upon the overhung end of their journals.

The husk is stripped off the ear by the combined but alternate action of one or more spiral series of spikes, D, and the biting edge of spiral grooves E, with which each roll is supplied and constructed, the rolls being so arranged, with reference to each other, that the spikes of one mesh into the grooves in the other.

Figure 1:
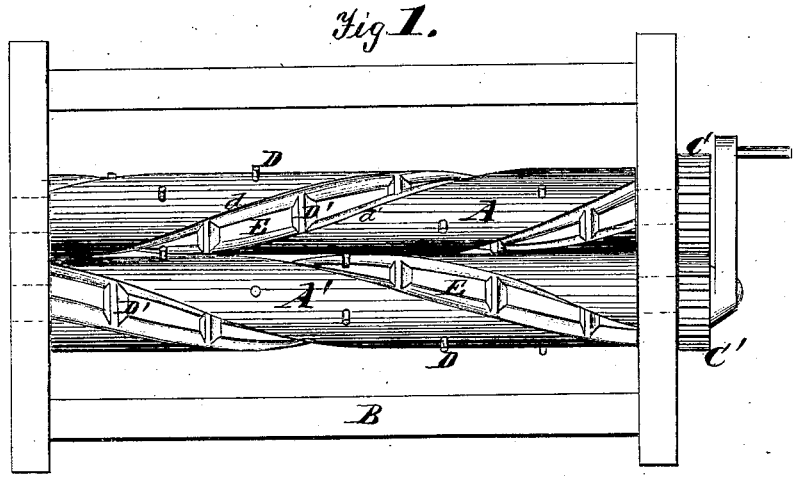
Figure 1 is a plan view of my improved husking-rolls.
Figure 2:
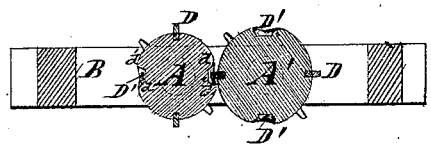
Figure 2 is a transverse section thereof.

The grooves are made of sufficient width and depth to permit the ear to settle down into them slightly; but, to prevent its entering too deep, which might cause its shelling, I form transverse partitions D' at short intervals in the grooves, the upper surface of which partitions is slightly below that of the roll, to which end they are made concave in the direction of their length, as shown in fig. 2 of the drawing.

The "biting" edge $d$ of the grooves is rounded, while the opposite side or edge $d'$ is nearly radial.

I am aware that a pair of husking-rolls has been employed, in which one had a spiral serrated bead meshing into a groove in the other, the bead being so arranged in relation to the groove that the biting-edge of the latter would take hold of the ear simultaneously with the serrated bead, the consequence of which was that the ear was partly shelled.

I entirely overcome this difficulty by arranging the spikes in such a manner that they enter the grooves near the edge which first approaches them, namely $d'$, so that, in griping the husk, they crowd or push the ear laterally, and their action upon the ear is completed or nearly so before the biting-edge of the groove takes hold of the husk, in doing which it throws the ear back into its original position.

Thus, a constant serpentine motion is imparted to the ear as it passes along the rolls, which causes it to move forward very freely, so that but a slight downward inclination need be given to the rolls.

It is apparent that it is not necessary to provide each roll with both grooves and spikes, but that the grooves may be all upon one and the spikes upon the other.

One of the rolls is made somewhat larger than its fellow, but they are geared together by wheels of equal diameter; the effect of which will be that, as both rolls make an entire revolution in precisely the same time, the surface of the larger one travels at a greater speed than that of the smaller one, whereby a constant rubbing action is obtained along the line of contact; and this result is accomplished without disturbing the action of the spikes and grooves, as the former always enter the latter at one and the same point. This rubbing of one roller upon the other keeps both entirely clean, so that the ordinary scraping devices can be dispensed with.

Having thus described my invention,

What I claim as new, and desire to secure by Letters Patent, is—

1. The arrangement, in a pair of husking-rolls formed substantially as described, of the spiral series of spikes D, in relation to the spiral grooves E, whereby said spikes are made to enter said grooves as near the edge $d'$ as practicable, as and for the purpose specified.

2. In combination with the spiral grooves E, of the husking-rolls A A', the partitions D', when the upper surfaces of said partitions are made concave, as shown in fig. 2 of the drawing, and for the purpose set forth.

3. The differential husking-rolls A A', provided with spiral grooves E and partitions D', formed as shown, and the spiral series of spikes D, all combined and arranged as described, and operated by equal gears C C', in the manner specified and set forth.

PETER PHILIP.

Witnesses:
 THOMAS C. CONNOLLY,
 THOS. S. MERCER.